United States Patent [19]

Beaudoin et al.

[11] Patent Number: 5,265,228
[45] Date of Patent: Nov. 23, 1993

[54] APPARATUS FOR TRANSFER OF DATA UNITS BETWEEN BUSES

[75] Inventors: Denis R. Beaudoin, Houston, Tex.; Andre Szczepanek, Brickhill, England

[73] Assignee: Texas Instruments Incorporated, Dallas, Tex.

[21] Appl. No.: 446,505

[22] Filed: Dec. 5, 1989

[51] Int. Cl.⁵ .............................................. G06F 12/06
[52] U.S. Cl. .................................... 395/425; 364/DIG. 1
[58] Field of Search ............................................. 365/220; 364/200 MS File, 900 MS File; 395/400, 425

[56] References Cited

U.S. PATENT DOCUMENTS

| | | | |
|---|---|---|---|
| 4,489,379 | 12/1984 | Lanier et al. | 364/200 |
| 4,642,755 | 2/1987 | Hinch | 364/200 |
| 4,649,479 | 3/1987 | Advani et al. | 364/200 |
| 4,660,130 | 4/1987 | Bartley et al. | 364/200 |
| 4,725,987 | 2/1988 | Cates | 365/220 |
| 4,777,591 | 10/1988 | Chang et al. | 364/200 |

Primary Examiner—Joseph L. Dixon
Assistant Examiner—Reba I. Elmore
Attorney, Agent, or Firm—Robert D. Marshall, Jr.; James C. Kesterson; Richard L. Donaldson

[57] ABSTRACT

The present invention includes a data transfer system (28) which includes a first bus (32) and a second bus (34) wherein both buses are bidirectionally connected to a first memory (30). Similarly, a third bus (42) and a fourth bus (44) are bidirectionally connected to a second memory (40). A plurality of data cells (50a through 50h) are provided for intermediate storage when units of information are transferred between first and second memories (30 and 40). A first pointer (37) is under control of first pointer circuit (36) and first control circuit (38) such that buses (32 and 34) may have access to selected ones of the plurality of data cells (50a through 50h). Similarly, a second pointer (47) is under control of second pointer circuit (46) and second control circuit (48) such that third and fourth buses (42 and 44) may have access to the plurality of data cells (50a through 50h).

46 Claims, 10 Drawing Sheets

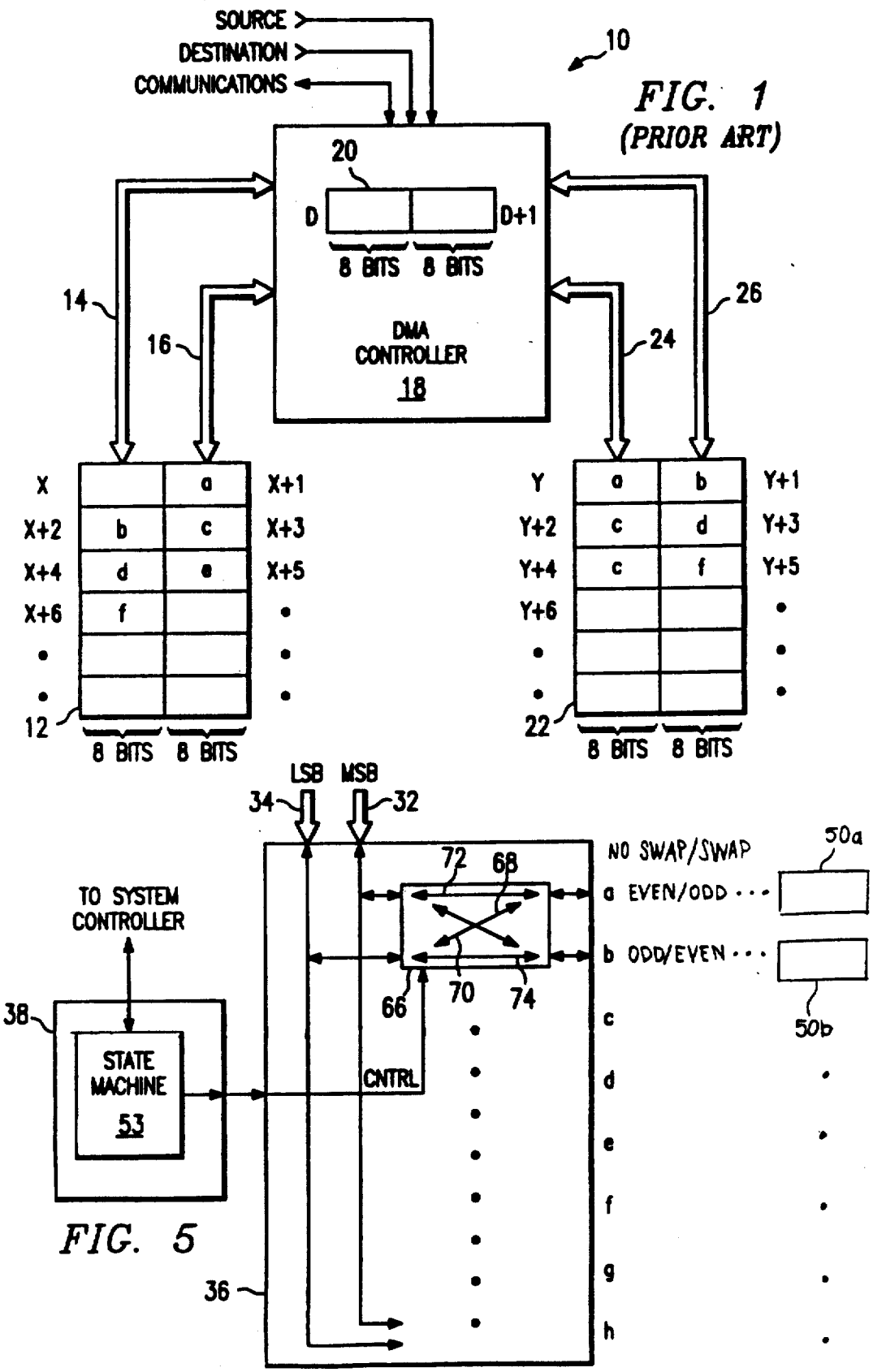

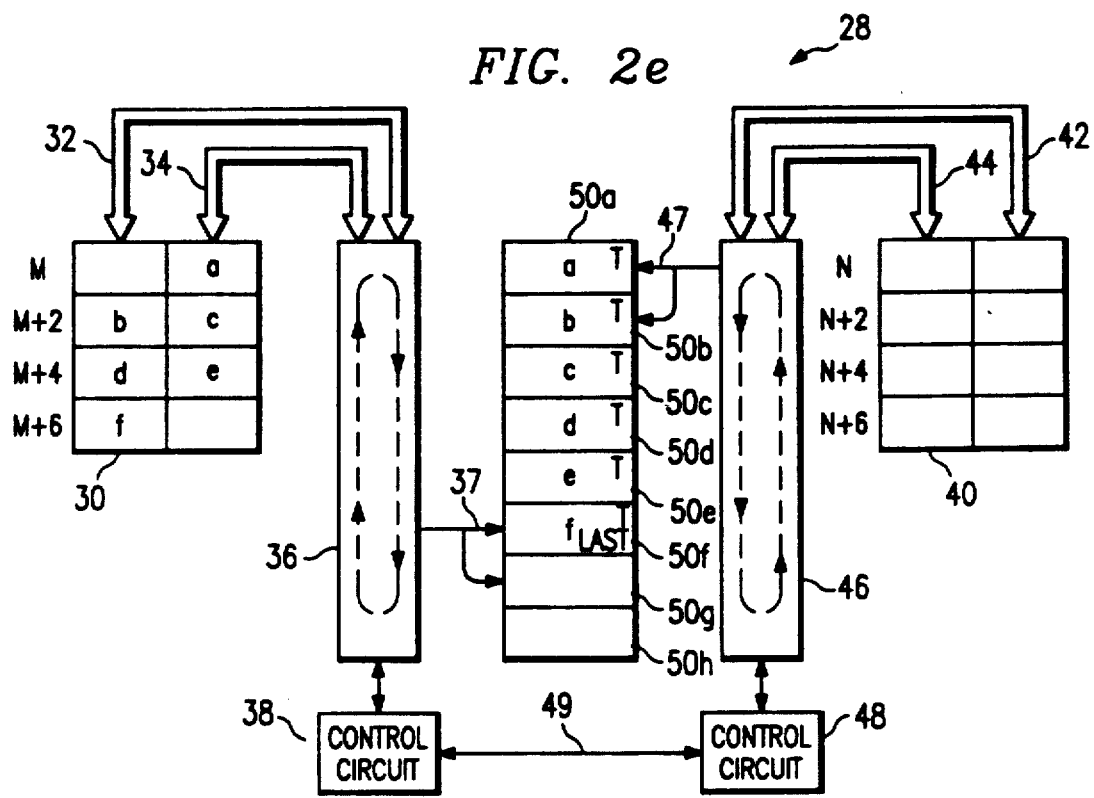
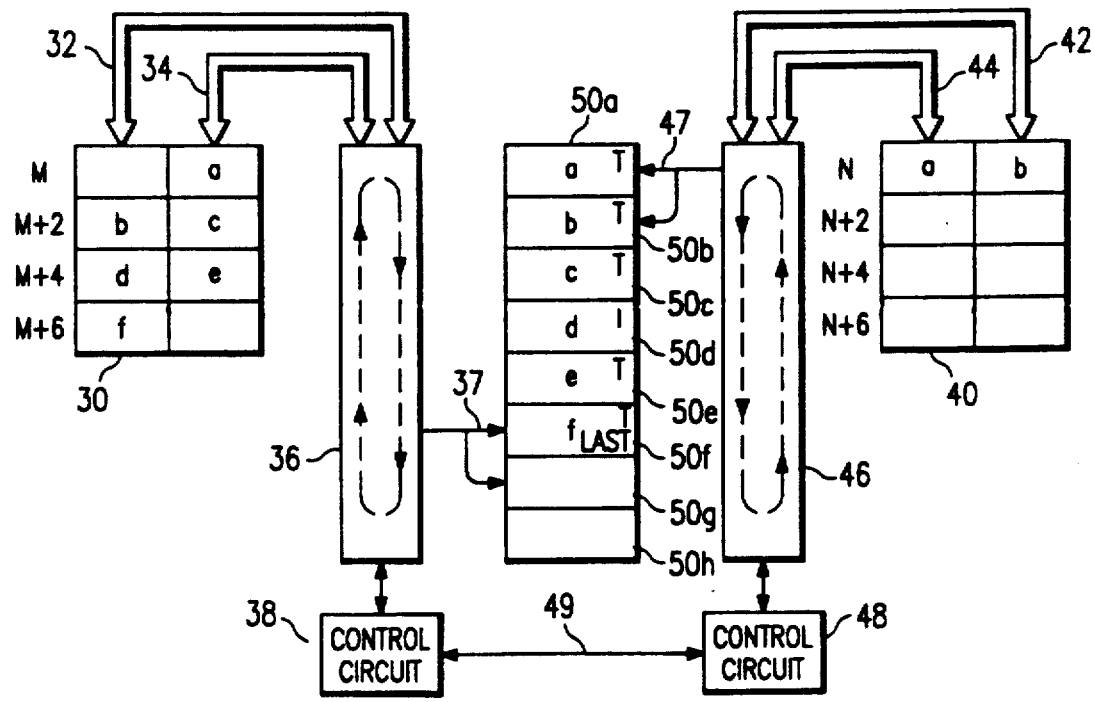

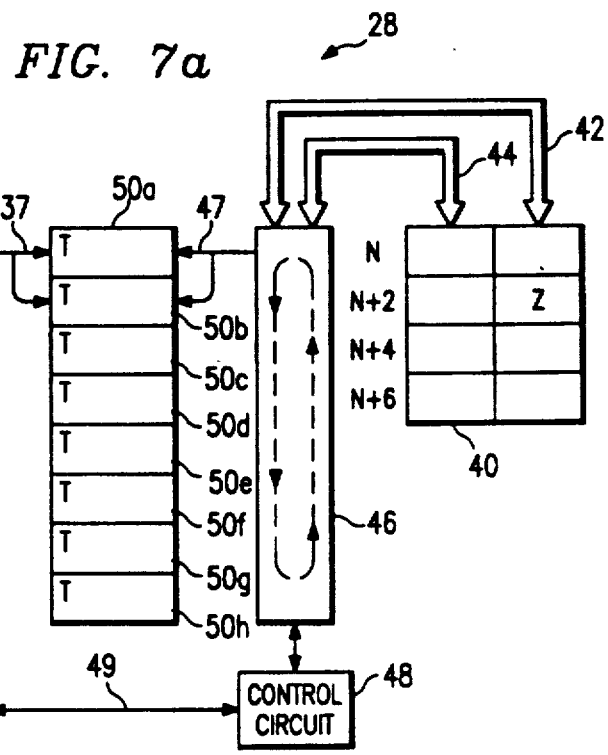
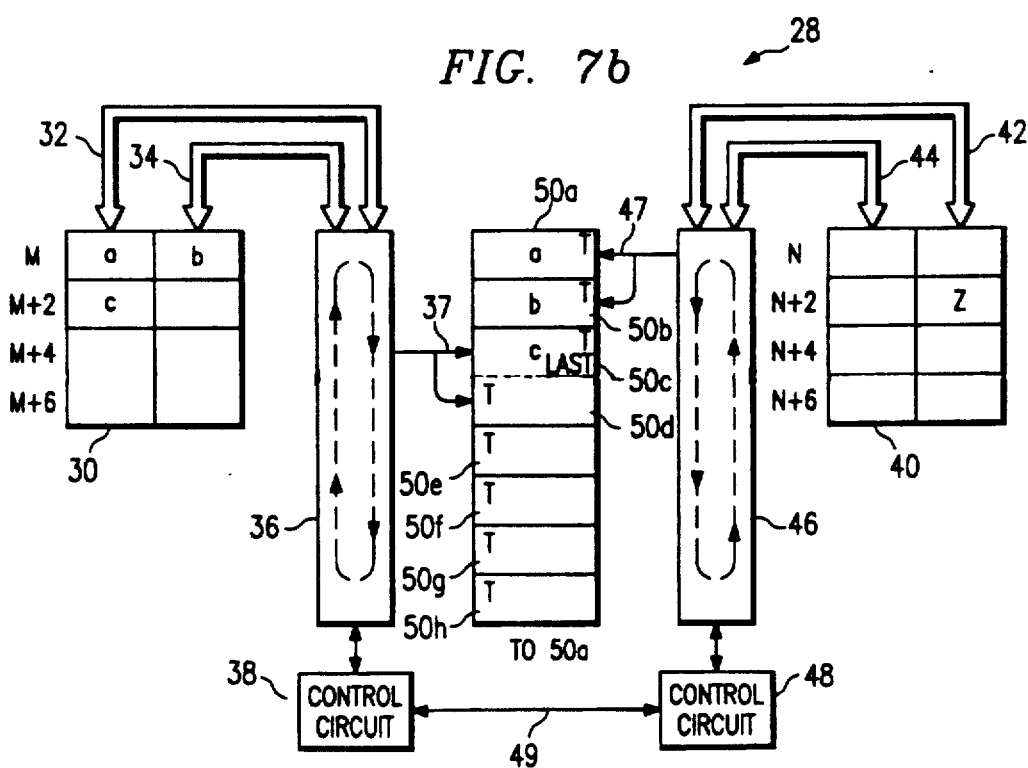

APPARATUS FOR TRANSFER OF DATA UNITS BETWEEN BUSES

TECHNICAL FIELD OF THE INVENTION

This invention relates to data transfer technologies and more particularly to a method and apparatus for efficient transfer of data between data buses.

BACKGROUND OF THE INVENTION

In microprocessor based systems, there are frequently two data buses that require data transfer to occur asynchronously between them. Frequently, one data bus is byte wide (i.e. eight bits), while the other is word wide (i.e., sixteen bits), or both data buses are word wide. Further, the data on one bus may be from a first block of memory which needs to be transferred to another block of memory connected to the second bus. The data involved in those transfers may start on either byte (i.e., odd) or word (i.e., even) addresses. Further, the length of this data may be of an odd or even byte length. Accordingly, the transfer of a number of data quantities may also end on an odd or even address.

In some communications systems, it is often necessary to transfer large amounts of data between 16-bit processor-based systems. Although the architecture may support sixteen bits, word transfers from odd addresses are still effected by accessing individual 8-bit quantities. In particular, there may be a need for data to be transferred from a word-aligned address to a byte-aligned address, or vice versa. Where only a single byte at a time is transferred, the effective transfer rate of this system is reduced to that of a byte wide system. Therefore, the reduction in the transfer rate may cause a 16-bit processor to deal with 8-bit quantities, thereby diminishing the effect of utilizing the 16-bit processor.

The problems associated with moving byte wide and word wide quantities further extends to even larger buses, such as 32-bit based systems. Again, effective transfer rates are lessened when the system is forced to transfer a single quantity of less than 32-bits in a given transfer cycle.

FIG. 1 illustrates a prior art data transferring system denoted generally at 10. Data transfer system 10 includes a first memory 12 having a first bus 14 and a second bus 16 connected thereto. Data buses 14 and 16 are bidirectionally connected to a DMA controller 18 which includes a temporary register 20 therein. Data transfer system 10 further includes a second memory 22 having a third bus 24 and a fourth bus 26 connected thereto. Third and fourth buses 24 and 26 are also bidirectionally connected to DMA controller 18.

First and second memories 12 and 22 are illustrated as 16-bit memories. For each 8-bit quantity within memories 12 and 22, an individual data bus 14, 16, 24 or 26 is provided to access the corresponding 8-bit quantity. Fir example, first data bus 14 can access even address locations (e.g., X, X+2, X+4, ...) within first memory 12. Similarly, second bus 16 may access odd address locations (e.g., X+1, X+3, ...) within first memory 12. An external device such as a central processing unit (not shown) may provide information relating to the source in which data is located and the destination to which that data need by transferred. The length, or number of bytes to be transferred, is also typically provided by the external device. Further, an address and a particular memory would be provided for both the source and destination of the data to be transferred. It should be noted that while two independent memories are illustrated, transfer of data may be from one location to another within the same memory. In this instance, data will be transferred along the same bus(es) to and from the single memory.

If a single byte of information is retrieved from an odd address within first memory 12, that information is effectively retrieved as a single byte and written into temporary register 20. Thereafter, the information is written from temporary register 20 to the appropriate destination address within second memory 22. Further, communications are provided between DMA controller 18 and an external device such that the external device may communicate a request for DMA controller 18 to begin operation and post its acknowledgment once it has completed the operation.

A particular inefficiency arises in data transfer system 10 when controller 18 is requested to access information at an odd address and transfer it to an even address. The illustration shown in FIG. 1 depicts first memory 12 having a data quantity "a" located at its first odd address denoted as X+1. Consider the instance where data quantity "a" followed by the additional data quantities "b" through "f" are sought to be transferred to second memory 22 to an even word format. In this instance, data quantity "a" is transferred to even address Y and data quantity "b" is transferred to odd address Y+1. Further, the remaining data quantities "c" through "f" are also to be transferred to word-aligned addresses. In this instance, DMA controller 18 will, in a first transfer cycle, access odd address X+1 via second data bus 16 and store the quantity "a" in the even address D of temporary register 20. Thereafter, the next data quantity "b" stored at address X+2 will be accessed in a second cycle via first data bus 14 and stored at the odd address D+1 of register 20. In a third cycle, the two 8-bit quantities within temporary register 20 will be transferred via third and fourth data buses 24 and 26, respectively, to the first word within second memory 22. From the above, it may be appreciated that three cycles are necessary in order to move the first two 8-bit quantities from a first memory 12 to a second memory 22. Thus, where the first of the two quantities is stored at an odd address and is sought to be transferred to an even address, three cycles are necessary to effect the transfer. Further, in order to transfer the remaining data bytes "c" through "f", an additional six cycles would be necessary such that a total of nine cycles are utilized in order to fully transfer the data string from first memory 12 to second memory 22.

Therefore, a need has arisen for an apparatus and methodology which effectively transfers data between different buses notwithstanding the width of each of the buses. Further, there is a need for an apparatus and methodology which efficiently transfers data from even or odd addresses to even or odd addresses without diminishing the effective system bus bandwidth.

SUMMARY OF THE INVENTION

In accordance with the present invention, an apparatus and method are provided which substantially eliminates or reduces disadvantages and problems associated with prior techniques utilized for transferring data from one bus to another bus.

The present invention includes a circuit for transferring blocks of data of a predetermined size. The circuit includes a plurality of data cells wherein each data cell is dimensioned to be the predetermined size of the blocks of data and is operable to store a block of data. Further included within a circuit constructed in accordance with the present invention is a first pointer operable to selectively couple a first and second bus to respective cells within the plurality of data cells. The selective coupling by the first pointer permits the first and second buses to access the respective cells coupled thereto. The present invention further includes a second pointer operable to selectively couple a third bus to a cell within the plurality of data cells. The selective coupling by the second pointer permits the third bus to access the cell which is coupled thereto.

The second pointer constructed in accordance with the present invention may further operate to selectively couple a fourth bus to a cell within the plurality of data cells. This selective coupling permits the fourth bus to have access to the cell which is coupled thereto. The pointers of the present invention may be advanced along a predetermined number of the plurality of data cells in accordance with the number of blocks of data either transmitted or accessed therefrom in a given transfer cycle.

The apparatus and methodology of the present invention provides for numerous technical advantages. The invention provides an efficient means by which data may be transferred between two buses notwithstanding the width of the buses. Another technical advantage of the present invention is that transfer of data between asynchronous buses is permitted. An additional technical advantage of the present invention is that word transfers are generally utilized even where the data is retrieved or transferred to or from an initial odd address. Accordingly, there is the technical advantage that data throughput is substantially maximized.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates a prior art configuration for a DMA controller;

FIG. 2e illustrates the transfer of the final data bytes from memory to a plurality of data cells and the setting of a last flag;

FIG. 3a illustrates a processing system in accordance with the present invention prior to transmittal of data from a plurality of to a second memory;

FIG. 5 illustrates a block diagram of a data swapping feature included within the present invention;

FIG. 7a illustrates an odd length data string to be transferred to an even address within a memory;

FIG. 7b illustrates the data processing system of the present invention following transmission of the odd length data string to of data cells.

DETAILED DESCRIPTION OF THE INVENTION

The present invention provides a novel method and structure for transferring information between two memories in a manner such that fewer transfer cycles are required as compared to existing methods and structures. It thereby yields a more efficient and less time consuming data throughput.

Figure 2A:
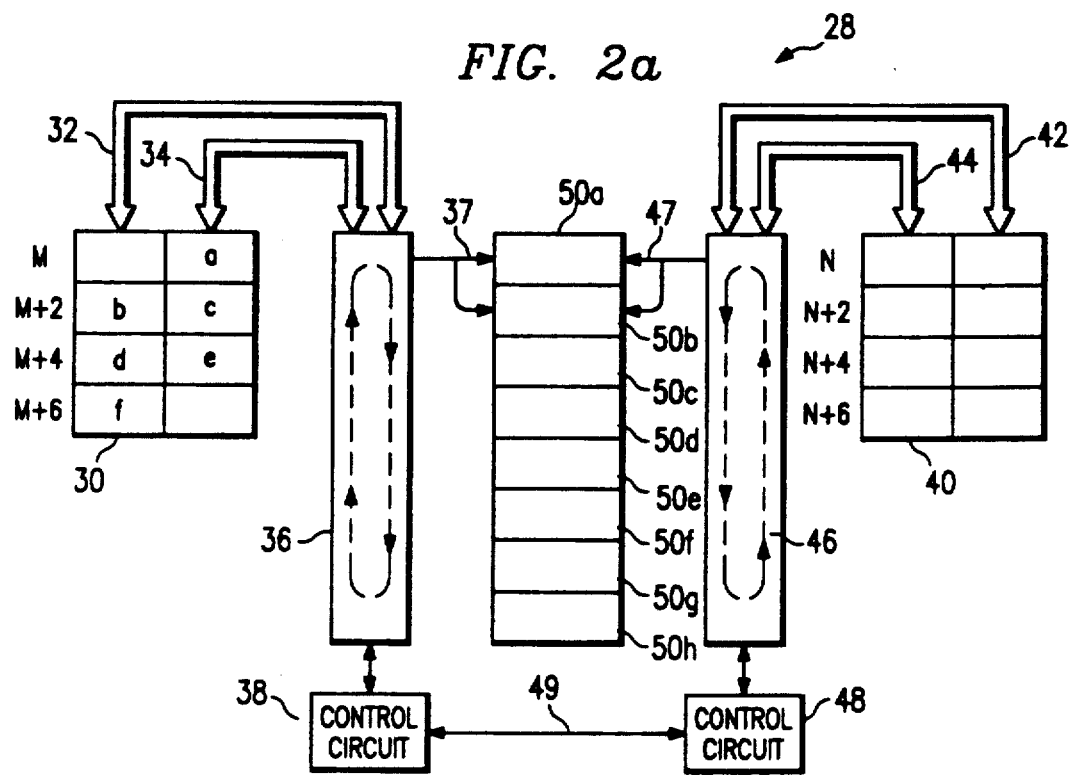
FIG. 2a illustrates a plurality of data cells connected between two or more data buses in accordance with the present invention.

FIG. 2a illustrates a block diagram of a data transfer system 28 constructed, and operable to perform the methodology of the present invention. Data transfer system 28 includes a first memory 30 having a first bus 32 and a second bus 34 bidirectionally connected thereto. First and second buses 32 and 34 are both dimensioned to handle a single data quantity storable at a single location within first memory 30. Typically, both buses 32 and 34 are each 8-bit wide buses. First and second buses 32 and 34 are both connected to a first pointer circuit 36 which directs a first pointer 37. Pointer 37 will simultaneously point to two successive cells within the plurality of data cells 50a through 50h. In general, data bus 32 may access "high bytes" (i.e., even addresses) from memory 30 while second bus 34 may access "low bytes" (i.e., odd addresses) from memory 30. A first control circuit 38 is also connected to first pointer circuit 36. A second memory 40 has a third bus 42 and a fourth bus 44 bidirectionally connected thereto. Third and fourth buses 42 and 44 are dimensioned in a manner like that of first and second buses 32 and 34. Third bus 42 may access low bytes from memory 40 while fourth bus 44 may access high bytes therefrom. Third and fourth buses 42 and 44 are connected to a second pointer circuit 46 which directs a second pointer 47 and has a second control circuit 48 connected thereto.

Second pointer 47 is operable to simultaneously point to two successive cells within the plurality of data cells 50a through 50h. It should be noted that the number of cells simultaneously pointed to by each pointer 37 and 47 will, in the preferred embodiment, equal the number of bytes corresponding to the number of byte buses associated with that pointer. Thus, if a 32-bit (i.e. four bytes wide) were implemented with pointer 37, pointer 37 would be constructed to point to four successive cells within the plurality of data cells 50a through 50h. A common control line 49 is connected between first and second control circuits 38 and 48. Both first pointer 37 and second pointer 47 are operable to point to a plurality of data cells denoted 50a through 50h. Pointer circuits 36 and 46 direct pointers 37 and 47, respectively, in a circular fashion. Thus, each pointer is advanced downwardly through data cells 50a through 50h. Upon reaching data cell 50h, the pointer circles around such that the next cell to which the pointer will point is data cell 50a. In the preferred embodiment, pointers 37 and 47 are constructed using shift registers such that a bit shifted therethrough will "point" to a particular one of the cells 50a through h. This bit may also be used as a control signal to connect any one of buses 32, 34, 42 or 44 to the cell to which one of the pointers is pointing, thereby permitting access to the cell by the bus connected thereto.

The detailed operation of data transfer system 28 will be described hereinafter, but the general operation thereof is as follows. In particular, data transfer system 28 receives a request from a system controller or system processor (not shown) or the like which provides a source address denoting the start of a data string, a destination address denoting the initial address to receive the first quantity within the data string, and a "length" parameter corresponding to the number of bytes within the data string to be transmitted from the source to the destination. Data transfer system 28 is therefore operable to transfer information between memory locations. For example, data may be transferred between first memory 30 and second memory 40. It should, however, be understood that data transfer could be effected from one location to another within the same memory, with data being taken from one location and transferred to another along the same data buses.

For exemplary purposes, first memory 30 is shown as containing six separate data quantities denoted as "a" through "f" therein. In order to illustrate certain aspects of the present invention, FIGS. 2b through 2f illustrate exemplary steps and structure in transferring data quantities "a" through "f" from first memory 30 to second memory 40. Although the transfer of data will be described as being from first memory 30 to second memory 40, it should be understood that data transfer system 28 is bidirectional in the preferred embodiment, and therefore permits transfer of data quantities from second memory 40 to first memory 30. It should further be understood that while in the preferred embodiment each data quantity "a" through "f" is shown as an 8-bit block of data, the same inventive concepts and principles discussed herein may be altered by one skilled in the art to apply to blocks of data of more or less than 8-bit quantities.

Figure 2B:
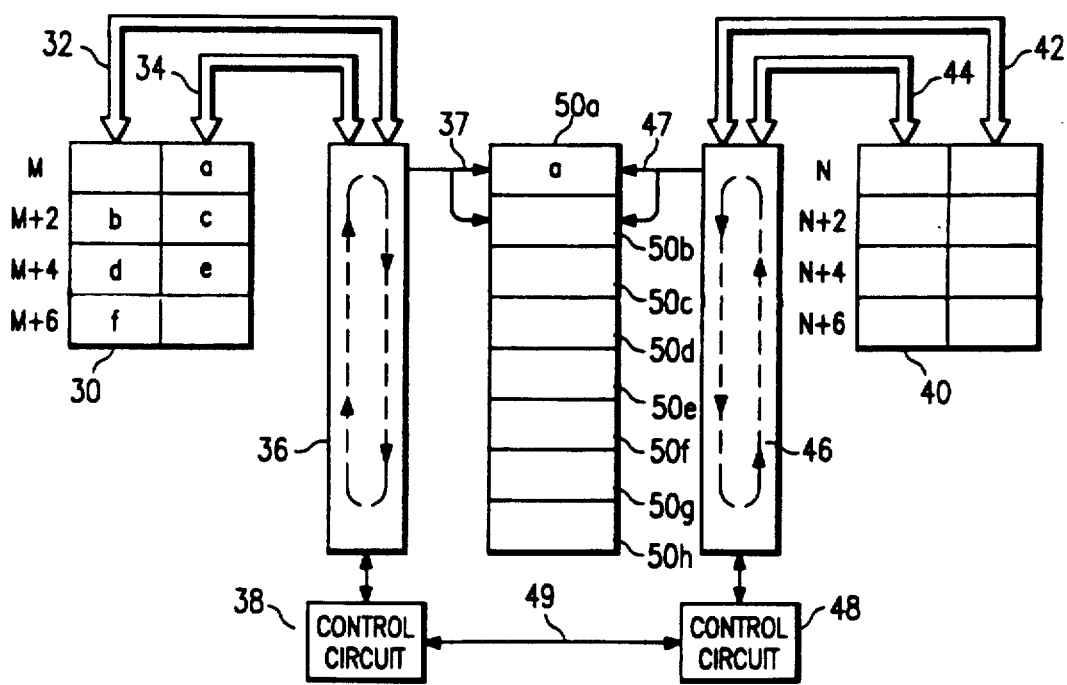
FIG. 2b illustrates the transfer of a single byte of information from a memory into one of the plurality of data cells.

FIG. 2b illustrates data transfer system 28 of the present invention in a first operation stage. First pointer circuit 36 is controlled by first control circuit 38 in order to transfer quantity "a" into data cell 50a. More particularly, quantity "a" is transferred from first memory 30 via second bus 34 by selectively coupling second bus 34 to data cell 50a. In particular, control circuit 38 operates to transfer information provided by first and second buses 32 and 34 to data cells 50a through 50h in accordance with the particular cells being pointed to by first pointer 37. Thus, in FIG. 2b, quantity "a" is transferred to first cell 50a because first pointer 37 of first pointer circuit 36 is directed to, and therefore selectively coupling data buses 32 and 34 to, data cells 50a and 50b. It should be noted that first pointer 37 points to two successive data cells. Accordingly, either one or two data quantities may be transferred to the data cells to which pointer 37 points.

Figure 2C:
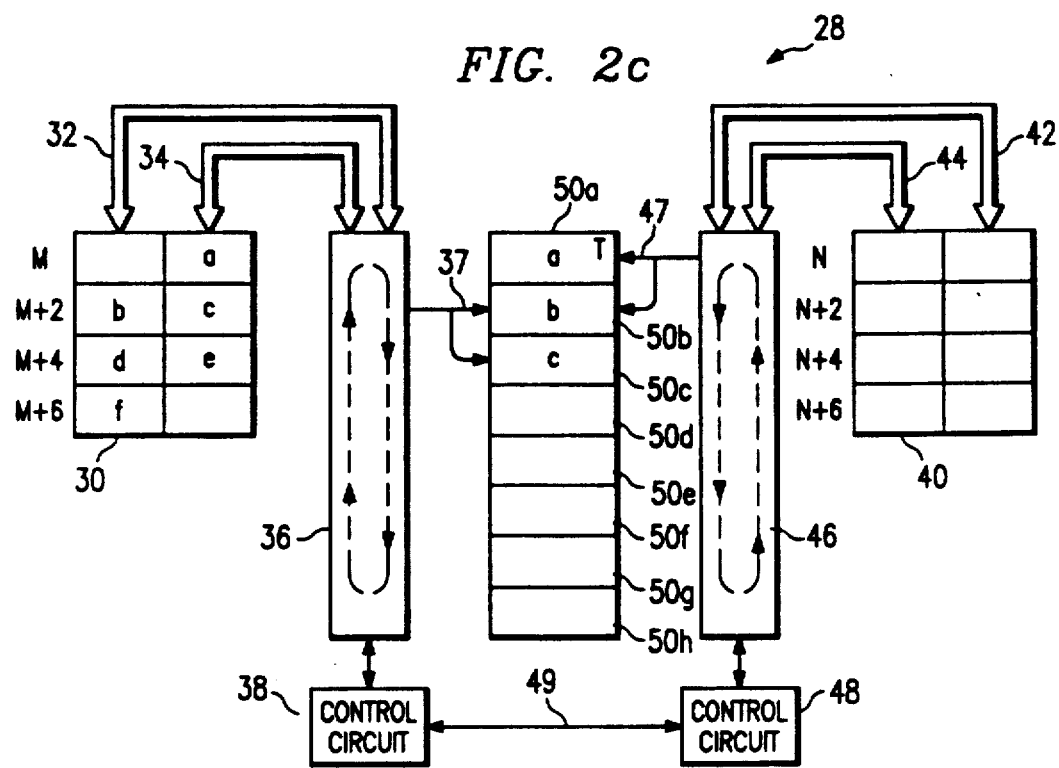
FIG. 2c illustrates the simultaneous transfer of two bytes of information from memory into the plurality of data cells.

FIG. 2c illustrates a block diagram of data transfer system 28 during the second step involved in the transfer of data quantities "a" through "f" between first and second memories 30 and 40, respectively. Following the transfer of data quantity "a" in the previous step, pointer 37 is moved along the plurality of data cells 50a through 50h. The number of moves of pointer 37 corresponds to the number of data quantities transferred between pointer 36 and the plurality of data cells 50a through 50h in the previous transfer. In other words, if one data quantity is transferred from first pointer circuit 36 to a data cell 50a through 50h, then pointer 37 is advanced only, by a single cell through the plurality of data cells 50a through 50h. However, if two data quantities are transferred in a single step from first pointer circuit 36 to the plurality of data cells 50a through 50h, then first pointer 37 advances two cells through the plurality of data cells 50a through 50h. Thus, because only the single data quantity "a" was transferred in connection with FIG. 2b, pointer 37 advances once and is shown to point to data cells 50b and 50c in FIG. 2b.

In addition to advancing pointer 37 after the transfer of a data quantity(ies), first control circuit 38 will provide an indication to second control circuit 48 that data has been stored in a data cell or cells and, therefore, that access to the cell is relinquished by the transmitting pointer circuit and given to the pointer circuit which is to retrieve information from the cell. In the preferred embodiment, this indication will be known as the giving of a "token." Thus, for each of the plurality of data cells 50a through 50h, there exists a plurality of tokens, each of which indicates which pointing circuit 36 or 46 has access to the respective data cell. The number of tokens given will equal the number of data quantities which were transferred. Thus, in FIG. 2c, one token for data cell 50a is given from pointer circuit 36 to pointer circuit 47. For purposes of illustration, the token will be shown as a "T" in the drawings, and will be placed on the side of each data cell corresponding to the respective pointer circuit which has access to the cell.

In addition to the movement of first pointer 37 and the passage of token(s), first control circuit 38 will also decrement the "length" parameter by the number of quantities transferred. As a result, the length parameter will indicate the remaining number of bytes to be transferred from first memory 30 to the plurality of cells 50a through 50f. Further, the address from where data is to be retrieved within memory 30 will be incremented by the same number as the number of bytes just transferred. Accordingly, the address is incremented once after the transfer of the single data quantity "a" from first memory 30 to data cell 50a.

Data transfer system 28 will operate to simultaneously transfer data quantities "b" and "c" from first memory 30 to data cell 50b and data cell 50c, respectively. In particular, data quantities "b" and "c" are transferred via first bus 32 and second bus 34, respectively, to first pointer circuit 36. Further, data quantities "b" and "c" are transferred from first pointer circuit 36 to data cells 50*b* and 50*c*, respectively, because first pointer 37 is selectively coupled to those two cells. Therefore, first pointer 37 will be advanced two data cells because two quantities of information were transferred. Further, two tokens corresponding to data cells 50*a* and 50*b* will be transferred from first pointer circuit 36 to second pointer circuit 46. Additionally, the length parameter will be decremented by two and the address incremented by two corresponding to the transfer of quantities "b" and "c".

Figure 2D:
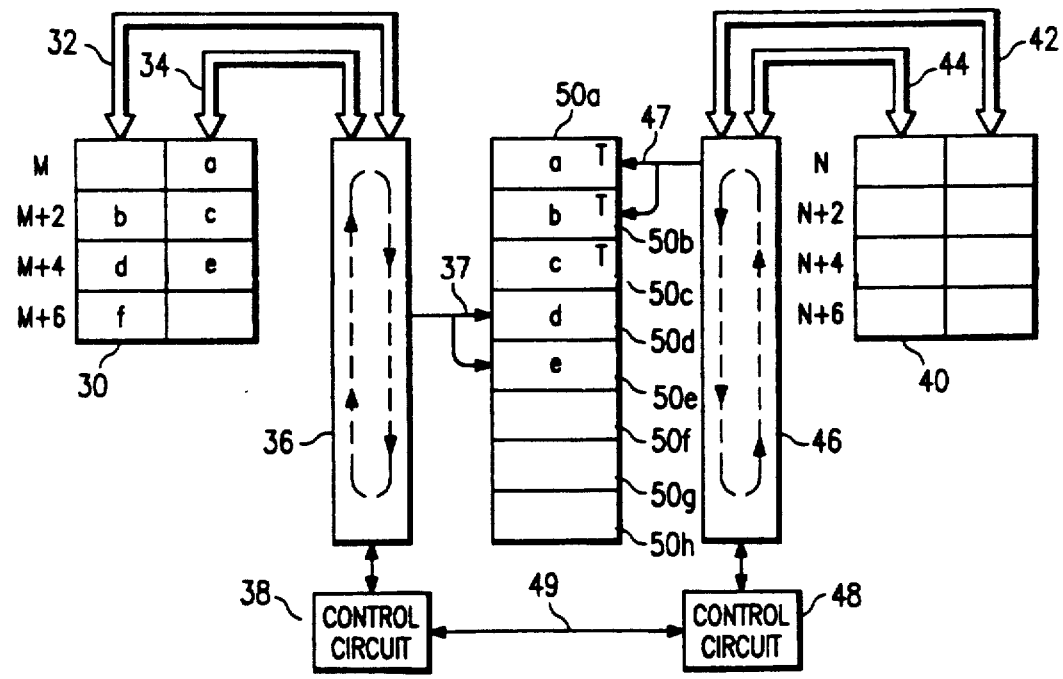
FIG. 2d illustrates the simultaneous transfer of two data bytes following those transferred in FIG. 2c.

FIG. 2*d* illustrates a block diagram of data transfer system 28 after transferring data quantities "d" and "e" from first memory 30 to the plurality of data cells 50*a* through 50*h*. The transfer of data quantities "d" and "e" is done in a manner like that discussed in connection with the transfer of data quantities "b" and "c" discussed in connection with FIG. 2*c*. Again, data quantities "d" and "e" are transferred via first and second buses 32 and 34 to first pointing circuit 36. First pointing circuit 36 transfers data quantities "d" and "e" to data cells 50*d* and 50*e*, respectively, because first pointer 37 points to those data cells. Further, because the transfer involves the movement of two data quantities "d" and "e", then first pointer 37 will again be advanced two data cells along the plurality of data cells 50*a* through 50*h*, two tokens corresponding to data cells 50*d* and 50*e* will be transferred to second pointing circuit 46, the length parameter will be decremented by two, and the address for first memory 30 will be incremented by two.

FIG. 2*e* illustrates a block diagram of data transfer system 28 during the transfer of data quantity "f" from first memory 30 to the plurality of data cells 50*a* through 50*h*. In particular, data quantity "f" is moved from address location M+6 of first memory 30 via first data bus 32 to first pointing circuit 36. Since first pointer 37 is pointing to data cell 50*f*, then data quantity "f" is transferred thereto. The length parameter currently equals one because only one quantity remains to be transferred from first memory 30. Accordingly, this indicates that data quantity "f" is the last data quantity involved in the current transfer. It should be noted that in instances where an even number of bytes are transferred from an even boundary, the length parameters equal two during the last transfer to data cells 50*a* through 50*f*. Control circuit 38 recognizes this as an indication that the second of the two bytes to be simultaneously transferred is the last byte within the data string.

Because data quantity "f" is the last data quantity within first memory 30 to be transferred to second memory 40, first control circuit 38 will operate to set a "LAST" flag associated with data cell 50*f* to indicate that data quantity "f" is the last data quantity within the sequence to be transferred to second memory 40. Further, when the last data quantity is encountered, first control circuit 38 will prevent pointer circuit 36 from advancing pointer 37. Accordingly, pointer 37 will remain pointing to data cell 50*f*. A single token, corresponding to the single data quantity "f" and data cell 50*f*, will be given from first pointer circuit 36 to second pointer circuit 46.

It should also be noted that the token feature of the present invention prevents overwriting of valid data within plurality of cells 50*a* through 50*h*. For example, if first memory 30 contained three more data quantities "g", "h", and "i", then pointer 37 would circle back to the top of plurality of cells 50*a* through 50*h* after transferring quantity "h" into cell 50*h*. However, first printing circuit 36 would then be unable to access data cell 50*a* because pointer circuit 46 possesses the token for that cell. Accordingly, no overwriting of the data quantity "a" within data cell 50*a* could occur.

Figure 3B:
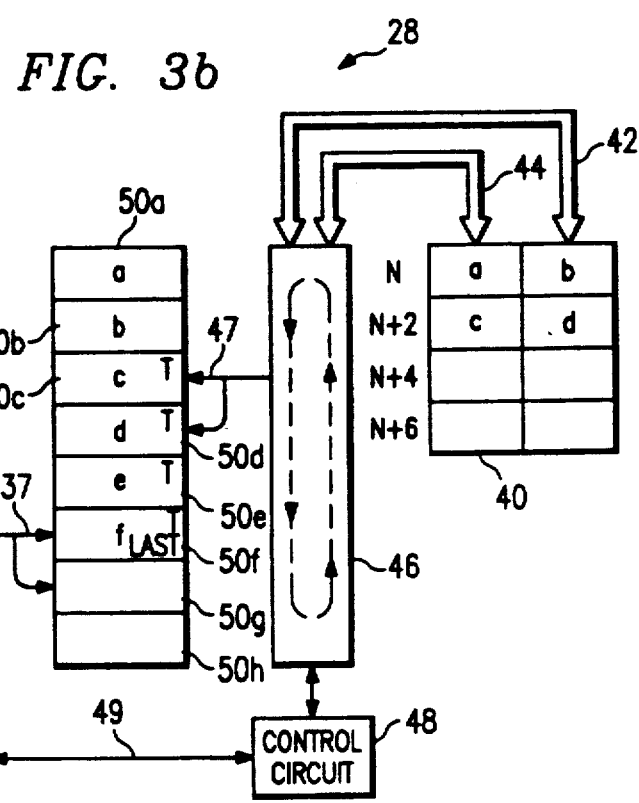
FIG. 3b illustrates the processing of the present invention following the transfer two data words from the plurality of data to a second memory.
Figure 3C:
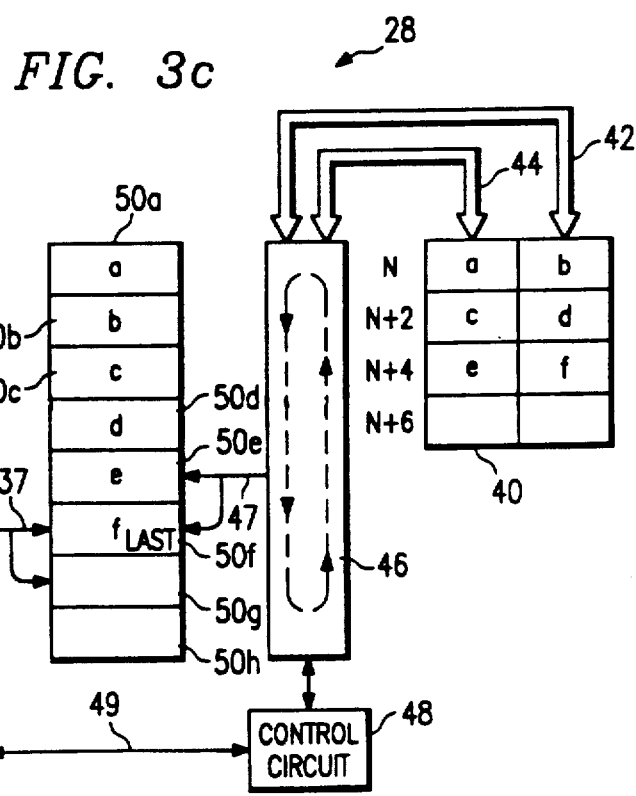
FIG. 3c illustrates the processing system of the present invention following completion of the transmission of a data string from one memory to another memory having an intermediate plurality of data cells connected therebetween.

FIG. 3*a* through FIG. 3*c* illustrates the transfer of data quantities "a" through "f" by data transfer system 28 from their respective data cells to second memory 40. Although the discussion of the transfer of these data quantities follows the discussion of the transfer of these data quantities from first memory 30 to data cells 50*a* through 50*f*, it should be understood that the transfer of these data quantities from the data cells to second memory 40 may commence before the last data quantity is transferred from first memory 30 data cell 50*f*. In other words, as soon as a token is identified by second control circuit 48, transmission of data quantities from the plurality of data cells 50*a* through 50*h* to second memory 40 may commence. However, for purposes of illustration, the following discussion will discuss the transfer of data quantities "a" through "f" from data cells 50*a* through 50*f* to second memory after each of those data quantities has been first transferred to those data cells from first memory 30.

From FIG. 3*a*, it may be appreciated that second pointer 47 is pointing to data cells 50*a* and 50*b*. Further, tokens are available to second control circuit 48 for both of those cells. Accordingly, second control circuit 48 may operate to communicate the contents of data cells 50*a* and 50*b* to fourth and third data buses 44 and 42, respectively. This communication permits addresses N and N+1 of second memory 40 to access data cells 50*a* and 50*b*, thereby permitting transfer of data quantities "a" and "b" to memory locations N and N+1 of second memory 40. Similar to the movement of first pointer 37, second control circuit 48 operates to advance second pointer 47 in accordance with the number of data quantities simultaneously moved from the plurality of data cells 50*a* through 50*h* to second memory 40. Because two data quantities "a" and "b" were transferred to second memory 40, second pointer 47 will advance two data cells to point to data cells 50*c* and 50*d* as shown in FIG. 3*b*. Further, the two tokens corresponding to data cells 50*a* and 50*b* are transferred from second pointer circuit 46 to first pointer circuit 36. Additionally, the address to which data is to be transferred to within second memory 40 will be incremented by two, that is, the number of data quantities just transferred.

With second pointer 47 in the advanced position illustrated in FIG. 3*b*, simultaneous transfer of data quantities "c" and "d" is possible through second pointer circuit 46 to fourth and third data buses 44 and 42, respectively. Accordingly, data quantities "c" and "d" may be transferred to locations N+2 and N+3, respectively, of second memory 40. Upon completion of this transfer, the tokens for data cells 50*c* and 50*d* will be returned to first pointing circuit 36, second pointer 47 will be advanced two positions along the plurality of data cells 50*a* through 50*h*, thereby pointing to data cells 50*e* and 50*f* as illustrated in FIG. 3*c*. Further, the address to which data is to be transferred within second memory 40 will be incremented by two.

With reference to FIG. 3*c*, it may be appreciated that with second pointer 47 in its illustrated position, data quantities "e" and "f" may be transferred through second pointer circuit 46 to fourth and third buses 44 and 42, respectively. This connection permits data quantities "e" and "f" to be transferred to memory locations N+4 and N+5, respectively, of second memory 40. Control circuit 48 will recognize that second pointer 47 is pointing to a data cell wherein the last flag is set. In particular, data cell 50f containing data quantity "f" will contain this indication which was previously set when data quantity "f" was transmitted thereto. The acknowledgement of the last flag and the transfer of the last quantity to memory 40 will indicate that the transfer of the entire data string of "a" through "f" has been completed. Thus, control circuit 48 can post completion of the transfer, and reset the entire data transfer system 28 to await the next request for a transfer.

Although the transfer of data quantities "a" through "f" discussed in connection with FIG. 2a through FIG. 3c above occurred between an odd address in first memory 30 and an even address in second memory 40, it should be understood that the novel control and pointing system and plurality of data cells discussed in connection with the present invention may be used between transmissions from even addresses to odd addresses, from even addresses to even addresses and from odd addresses to odd addresses. Further, &he transfer may be from a single transmitting data bus to a single receiving data bus. Still further, the transfer may be from a single data bus to a plurality of data buses or from a plurality of data buses (e.g., 32-bit systems) to a single data bus. In each of these instances, the novel control and pointing system and plurality of data cells used as an intermediate stage between the transferring mechanisms will provide for efficient throughput of data.

Different schemes may also be established for the transfer of tokens between first and second pointing circuits 36 and 46. In the preferred embodiment, first pointer circuit 36 is designated as a master pointing circuit while second pointer circuit 46 is designated as a slave circuit. Accordingly, first pointer circuit 36, as master, will initially have all tokens corresponding to the plurality of data cells 50a through 50h available to it so that it may transmit information thereto. Again, as information is transmitted to each cell, the corresponding token would be transferred to second pointer circuit 46 so that it may access the information from the data cells. However, in this situation, additional communications must occur via common control line 49 in the instance where second pointer circuit 46 needs to transfer data quantities from memory 40 to the plurality of data cells. In this instance, following a reset, first pointer circuit 36 acting as the master, will have all the tokens. However, because second pointer circuit 46 needs the tokens prior to transmission of data, second control circuit 48 will indicate this need via common control line 49 to first control circuit 38. Upon acknowledging this request, first control circuit 38 will operate to transfer all tokens to second pointer circuit 46. Thereafter, second pointer circuit 46 may transmit the data string in accordance with the principles discussed above. Further, first pointer circuit 36 may retrieve this information also as discussed above.

The master/slave configuration discussed above, however, should not be limiting in that additional schemes for the passing of tokens may be generated by one skilled in the art. For example, an independent control circuit could be established which, following a reset, possesses all tokens and distributes them to either first pointer circuit 36 or second pointer circuit 46 upon a request therefor. Once either of the pointer circuits received the tokens, it could transmit the information in a manner discussed above while transferring tokens accordingly. Upon completion of the transfer between the source and destination memories, the system could be reset with all tokens again relinquished to the independent control circuit.

Figure 4:
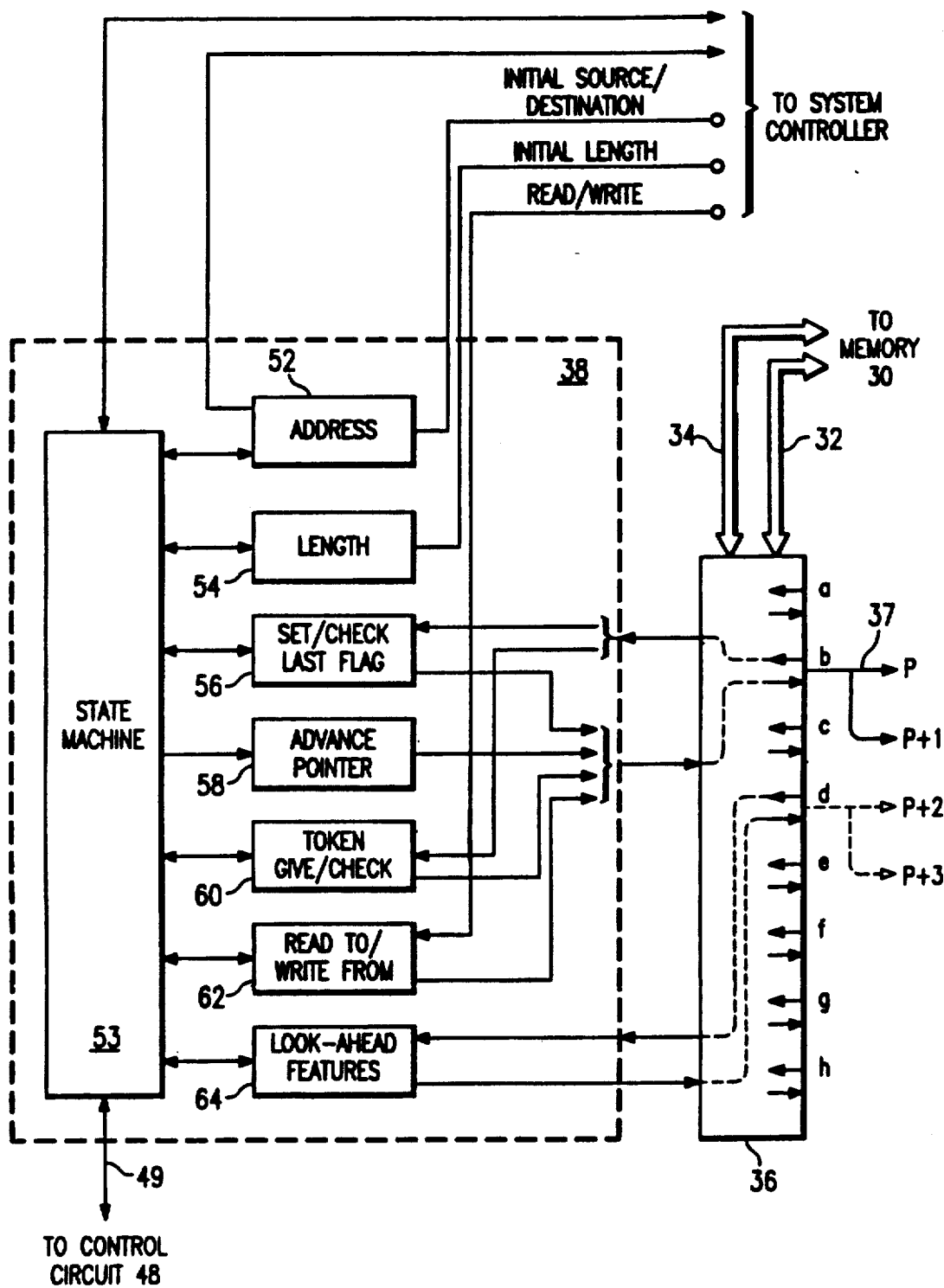
FIG. 4 illustrates a block diagram of a control circuit utilized for the pointing configuration discussed in connection with FIGS. 2a-3c.

FIG. 4 illustrates a block diagram of the internal components of control circuit 38 with alternative features added thereto. Many of the components illustrated in FIG. 4 may be similarly used in second control circuit 48. For exemplary purposes, first pointer 37 is illustrated as pointing to arbitrary locations, P and P+1. First control circuit 38 includes an address register 52 for receiving the initial source or destination for either retrieving information from the source at the address provided or directing information to the destination at the address provided. Address register 52 has an output in order provide the desired address of either the source or destination to the system controller which directs the selected data bus to the address indicated. Address register 52 is also connected to state machine 53 so that the address may be incremented after each transfer as discussed above.

First control circuit 38 further includes a length register 54. Length register 54 includes an input for receiving the initial length of the number of bytes within the data string to be transmitted. Length register 54 is also connected to state machine 53 so that the length parameter stored therein may be decremented upon transmissions as discussed above. Further, state machine 53 monitors the length parameter in order to set the last flag when the length equals one or two as discussed above. Additional uses of the length parameter will be discussed in more detail below.

First control circuit 38 may further include a set-/check last flag circuit 56. Set/check last flag circuit 56 is connected to state machine 53. State machine 53 will monitor the length parameter within length register 54 so that it may indicate to set/check last flag circuit 56 to set the last flag within the appropriate cell pointed to by first pointer 37 in accordance with the value of the length parameter. For example, where the length parameter equals two, state machine 53 will cause circuit 56 to set the last flag at the P+1 location pointed to by first pointer 37. In the instance where the length parameter equals one, then state machine 53 will cause circuit 56 to set the last flag at location P pointed to by first pointer 37. Again, if a 32-bit bus width were used with the present invention, then state machine 53 and circuit 56 could be modified in order to appropriately set the last flag at the proper location when the length equaled either three (setting last flag at P+2 location) or four (setting the last at the P+3 location). Circuit 56 also operates to check whether the last flag is set in a particular cell pointed to by first pointer 37 when information is being retrieved by first pointer circuit 36. Once the last flag is recognized by the pointing circuit retrieving information from the plurality of data cells, the information is retrieved and the system is notified that the transmission and receipt of information has been completed.

An advance pointer circuit 58 is included within first control circuit 38 in order to advance first pointer 37 in accordance with the principles discussed above. State machine 53 monitors the number of bytes transmitted or received by first pointer circuit 36 and advances first pointer 37 therewith. Further, state machine 53 will prevent advancement of first pointer 37 through advance pointer circuit 58 when the last flag is encountered and indicated as such by set/check last flag circuit 56.

A token give/check circuit 60 is also included within first control circuit 38. State machine 53 controls token give/check circuit 60 in order to transmit the proper number of tokens as discussed above. Further, token give/check circuit 60 can check the data cells pointed to by first pointer 37 in order to determine if a token exists therein thereby permitting first pointer circuit 36 to have access to the contents of that cell. Therefore, token give/check circuit 60 will examine a cell to determine ownership, or access to, that cell. If a token exists, the associated pointer can therefore either write to, or read from, that cell.

A read to/write from block 62 is included within first control circuit 38. Block 62 permits either a read of data from a data bus to a data cell or in the alternative, to permit a data write from a data cell to a data bus.

First control circuit 38 may further include a look-ahead features circuit 62. Look-ahead features circuit 62 is operable to investigate whether there exists tokens in each of the two successive data cells existing after the two current data cells to which first pointer 37 is pointing. In other words, look-ahead features circuit 62 will examine the P+2 and P+3 data cells in order to determine whether the tokens have been passed from second pointer circuit 46 so that first pointer circuit 36 will have access thereto once first pointer 37 reaches those cells. In the instance where there exists two tokens in these next two cells, state machine 53 need not relinquish control of the data buses to the system controller. In other words, the additional two tokens are an indication that first pointer circuit 36 will have information to retrieve from the next two successive cells (provided the last flag is not set at location P or P+1), and therefore should not relinquish control of data buses 32 and 34. By reserving control over data buses 32 and 34, the time otherwise required in requesting access to the buses and receiving a grant thereof is eliminated, therefore maximizing processing efficiency.

FIG. 5 illustrates a block diagram for describing a data swapping feature included within the present invention. Again, first pointer circuit 36 is shown having first and second buses 32 and 34 connected thereto. A data swapping circuit 66 is shown within first pointer circuit 36. Data swapping circuit 66 includes a first swapping line 68 and a second swapping line 70. Further included within data swapping circuit 66 are a first direct passing line 72 and a second direct passing line 74. Data swapping circuit 66 receives a control signal from state machine 53 within first control circuit 38 which indicates whether swapping is necessary.

As indicated in many of the above discussed FIGURES, first bus 32 is connected to the even bytes of first memory 30, while second bus 34 is connected to the odd bytes thereof. In conventional standards, the even byte of information is considered the most significant byte while the odd byte is considered the least significant byte. Therefore, first bus 32 has access to the most significant byte while second bus 34 has access to the least significant byte. Where first and second buses 32 and 34 are configured in the same manner as third and fourth buses 42 and 44, then a transfer of a most significant byte from an even address within first memory 30 via first bus 32 to an even address within second memory 40 may occur to fourth bus 44 which, in general, handles most significant bytes. Similarly, second bus 34 may transfer least significant bytes to third bus 42 when transferring between odd addresses in memories 30 and 40, respectively.

In some instances, however, the receiving data buses are configured in opposite configuration from the data buses transmitting information. For example, first and second buses 32 and 34 may be configured in a so-called "little indian" configuration. The little indian designation means that the even byte data bus is considered to be the least significant byte while the odd byte data bus is considered to be the most significant byte. Accordingly, the present invention includes an additional feature which permits data swapping. In particular, swapping permits the most significant byte of information provided by first bus 32 to become the odd byte of information. Additionally, swapping permits the least significant byte of information provided by second bus 34 to become the even byte of information. In particular, state machine 53 receives a signal from system controller indicating that the bytes of information need to be swapped between first and second buses 32 and 34 and the cells to which they are connected.

Data swapping circuit 66 also includes a first direct passage line 72 and a second direct passage line 74. These lines permit data quantities to pass straight through data swapping circuit 66 thereby avoiding the swapping feature. Accordingly, a data quantity which is retrieved from a high byte location will be transferred to a high byte location, and similarly, a data quantity retrieved from a low byte location will be transmitted to a corresponding low byte location.

It should be noted that while data swapping circuit 66 is shown in relation to locations "a" and "b", the swapping feature exists between any two successive cells within the plurality of data cells 50a-50h. Further, while the swapping feature is illustrated as existing within first pointer circuit 36, the same may be constructed in the alternative within second pointer circuit 46. The swapping feature will always be provided between the "little indian" buses and the plurality of data cells 50a through 50h. Additionally, swapping can occur when receiving information rather than when transmitting it as discussed above. Still further, the data swapping feature may be effected by controlling the inputs and outputs to each individual data cell within the plurality of data cells 50a-50h, rather than swapping the data within either first pointer circuit 36 or second pointer circuit 46.

Figure 6A:
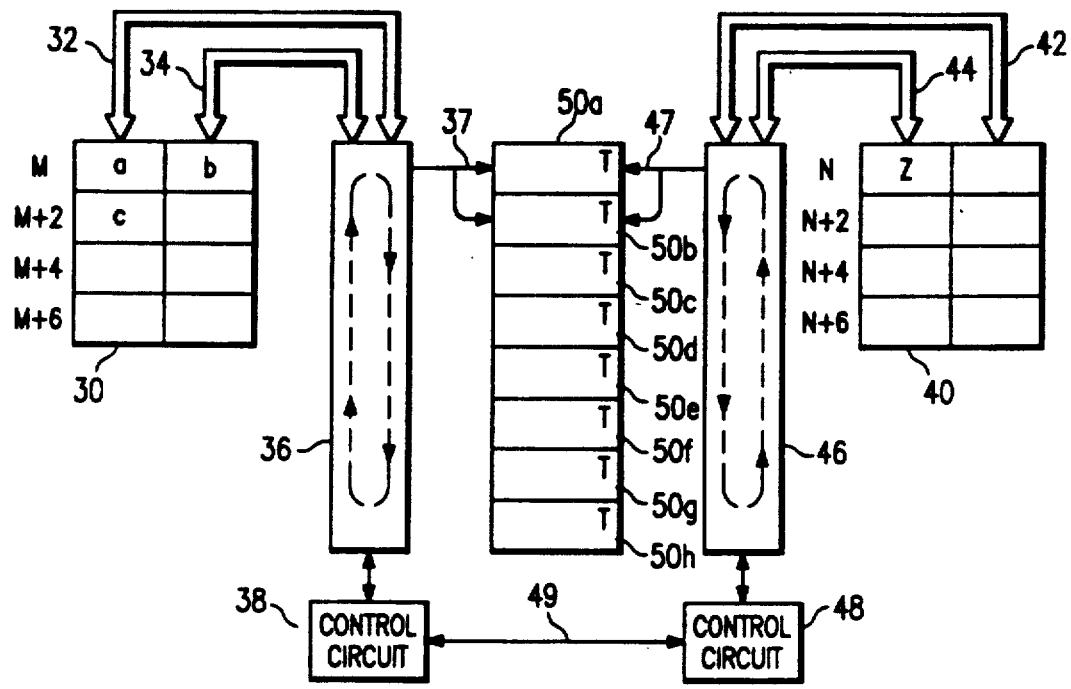
FIG. 6a illustrates a data transfer situation in which an odd length data string is to be transferred to an odd address in memory.
Figure 6B:
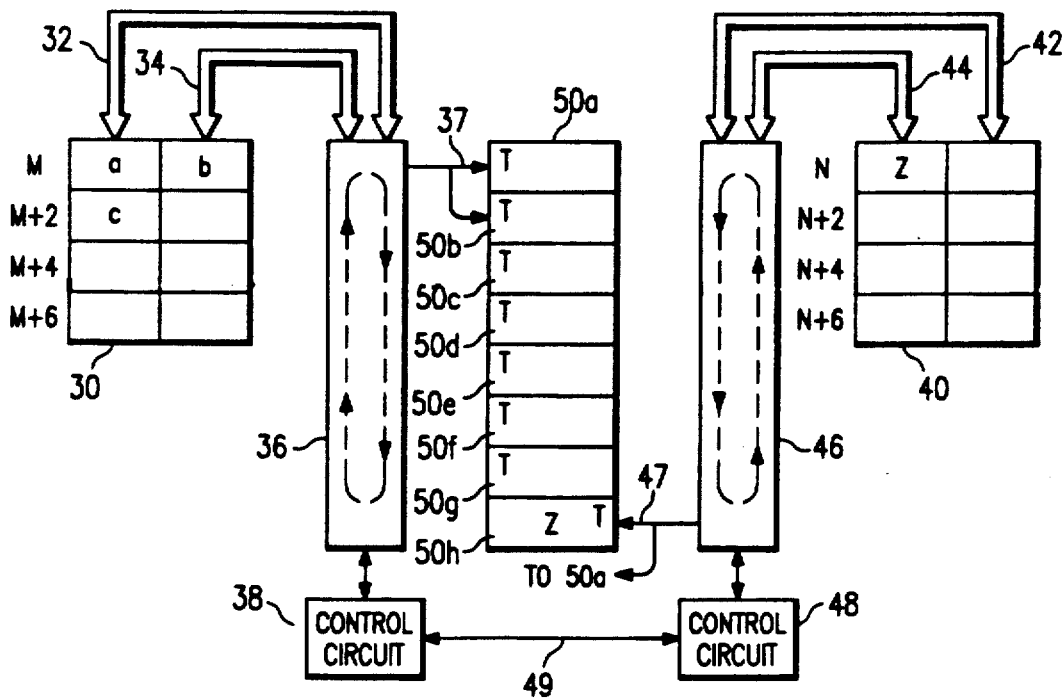
FIG. 6b illustrates a read-modify-write step utilized in the present invention in order to transfer an odd length data string to an odd address within memory.
Figure 6C:
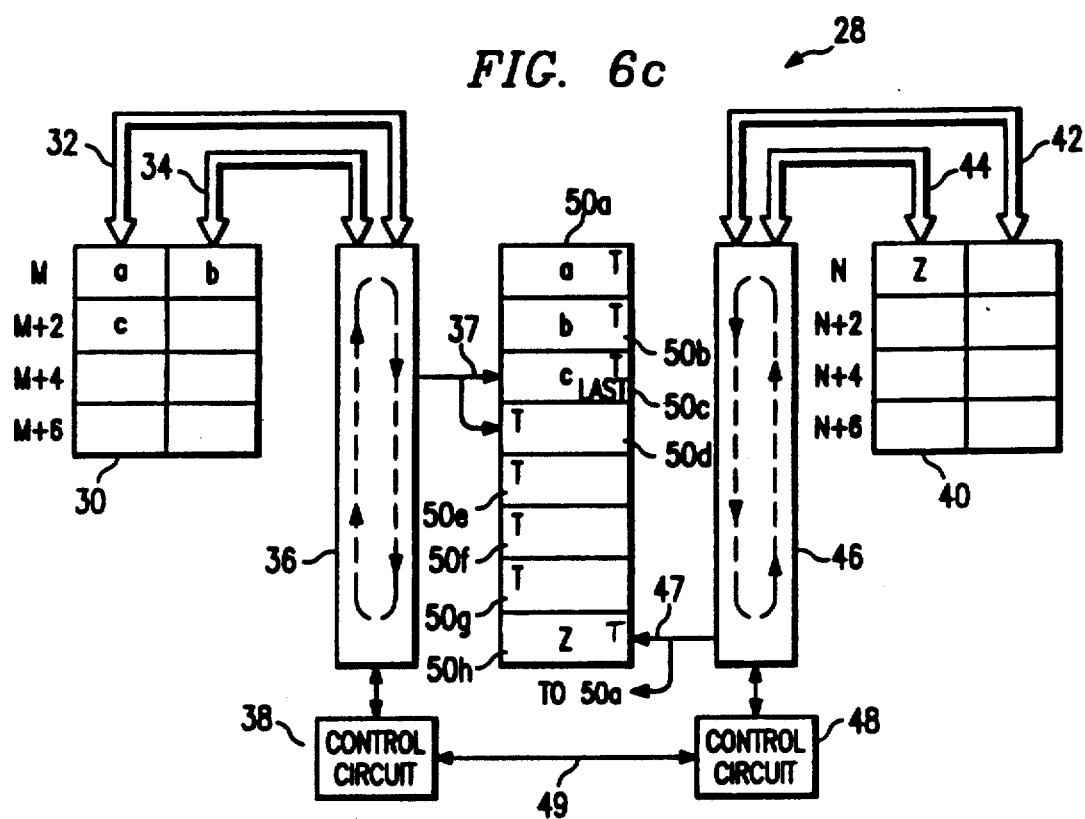
FIG. 6c illustrates the transfer of an odd length data string to the plurality of data cells included within the present invention.

FIGS. 6a-6c illustrate a read-modify-write feature (RmW) included within the present invention. In certain memory configurations, it is common that multiple data buses accessing the same memory are only capable of writing a word at a time, and the word must be written to an even address within that memory. For example, consider the instance where third data bus 42 and fourth data bus 44 may only write a single word at a time which starts at an even address. In other words, a single word may be written starting only from an even address within second memory 40 (i.e., starting at N, N+2, ... ). This limitation, however, may be circumscribed by a novel feature included within the present invention. The following example, discussed in connection with FIGS. 6a-6c, illustrates this limitation and the novel method and circuit for circumscribing the same.

For exemplary purposes, FIG. 6a shows a 3-byte quantity stored within first memory 30 to be transmitted to second memory 40. Further, the 3-byte quantity is to be transferred to start at an odd address (N+1) within second memory 40. Thus, a data string having an odd length is to be transferred to an odd address in a memory system which permits word writes to even boundaries only. Accordingly, there exists a need for an effective way to put the data quantity "a" into the odd address N+1 without disturbing the valid data quantity "Z" at the even address N within second memory 40.

FIG. 6b illustrates data transfer system 28 in its initial step in writing an odd length data string into second memory 40 to commence at an odd address. Second pointer circuit 46 advances second pointer 47 to point to the "bottom" data cell 50h within the plurality of data cells 50a-50h. As second pointer 47 advances through the plurality of data cells to reach data cell 50h, a token for each cell, except for bottom cell 50h, is transferred to first pointer circuit 36. Upon pointing to data cell 50h, second control circuit 48 causes the data contents at odd address N, namely, data quantity "Z" to be read into data cell 50h. It should be noted that second pointer 47 points to two successive cells, and therefore the second successive cell being pointed to is the top cell 50a within the plurality of data cells. As will be apparent in FIG. 6c, this permits writing of a word to an even address within second memory 40 despite the limitations previously discussed.

As shown in FIG. 6c, after second pointer circuit 46 retrieves data quantity "Z" and places the same in data cell 50h. First pointer circuit 36 retrieves data quantities "a" through "c" and places them within data cells 50a through 50c in the manner as discussed in connection with FIGS. 2a-2e. Once data quantity "c" is placed within data cell 50c, the last flag is set. Second pointer circuit 46 may begin retrieving information for storage into second memory 40 once it receives tokens for two successive data cells 50a through 50h. At this point, second pointer 47 is pointing to two successive data quantities, "Z" and "a". Thus, in the first transfer to second memory 40 via second pointer 47, these two data quantities will be written into second memory 40 beginning at an even address (i.e., even address N).

Figure 6D:
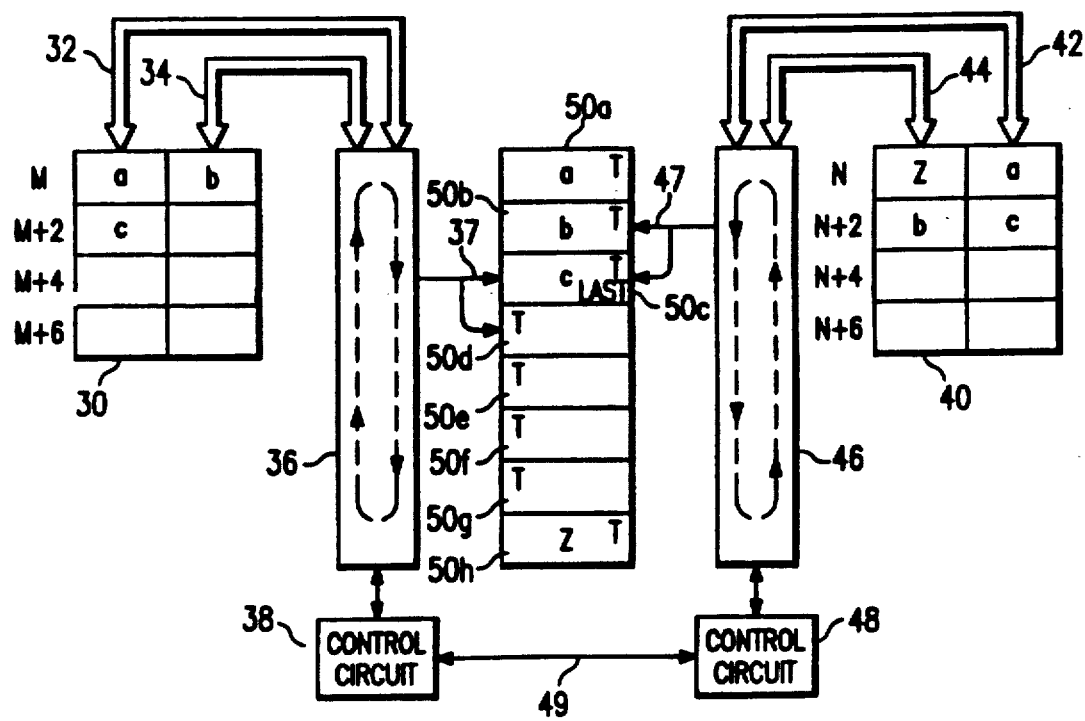
FIG. 6d illustrates the transmission of data from the plurality of data cells to an odd location within a second memory.

FIG. 6d illustrates data transfer system 28 after data quantities "Z" and "a" through "c" have been transferred to second memory 40. From this illustration, it may be appreciated that data quantity "Z" has been read into data cell 50h and then rewritten back to second memory 40. Thus, there is a read-modify-write of the data quantity which further permits writing to commence effectively at an even address within second memory 40, while placing the new data quantities "a" through "c" in second memory 40 beginning at odd address N+1.

Figure 7C:
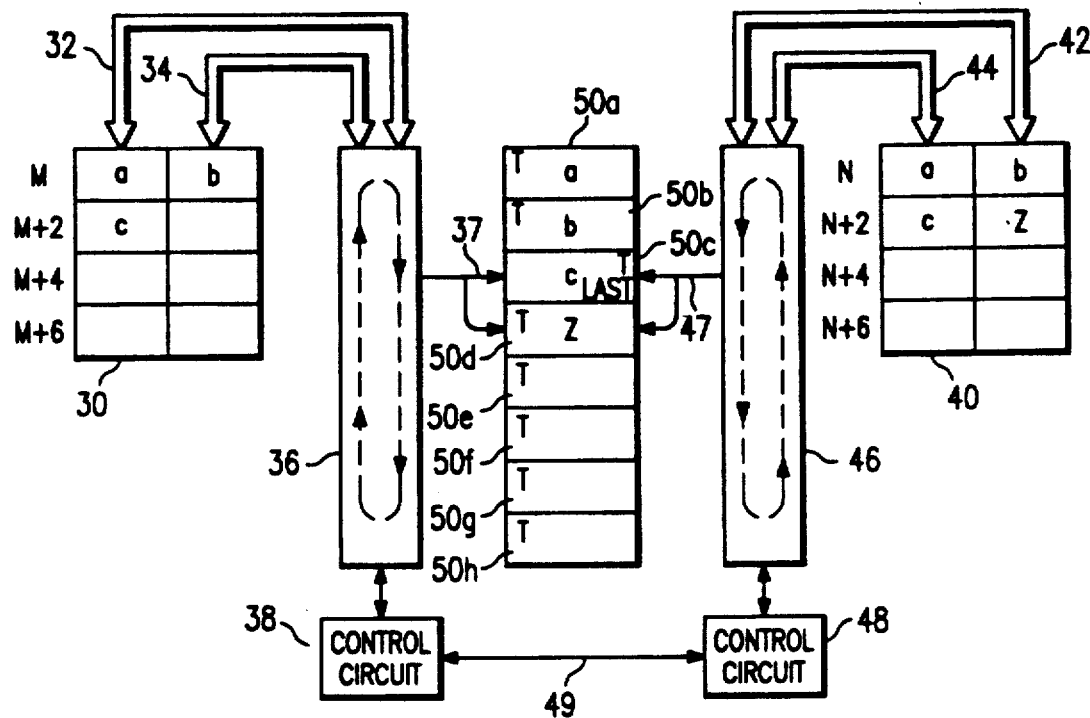
FIG. 7c illustrates the present system after having transferred the odd length data string to an even address within a second memory.

FIGS. 7a-c illustrate an additional use of the read-modify-write feature discussed in connection with FIGS. 6a-d. In FIG. 7a, there is again shown a 3-byte data string "a" through "c" to be transferred from first memory 30 to second memory 40. In this instance, however, the data string will commence storage at an even address (i.e., N) within second memory 40. However, because the length of the data string to be transferred is odd, the last byte therein will necessarily be stored at an odd address within second memory 40. Because third and fourth data buses 42 and 44, for exemplary purposes, are limited to even boundary word writing, then there must be an additional feature for protecting the valid data quantity "Z" stored in second memory 40 at location N+3. In other words, when an entire word is written in locations N+2 and N+3, the system must operate to prevent overwriting the valid quantity "Z" stored at location N+3.

FIG. 7b illustrates data transfer system 28 after data quantities "a" through "c" have been written into data cells 50a through 50c, respectively. Again, the transfer of these data quantities into the plurality of data cells 50a through 50h occurs in accordance with the principles discussed above in connection with FIGS. 2a-2e. Thus, as each data quantity is written, the token is transferred from first pointer circuit 36 to second pointer circuit 46 and first pointer 37 advances until the last flag is set within data cell 50c. Once the last flag is set, second pointer circuit 46 recognizes that it may commence transfer of the data quantities "a" through "c" to second memory 40.

FIG. 7c illustrates the transfer of data quantities "a" through "c" from data cells 50a through 50c, respectively, to second memory 40. Initially, data quantities "a" and "b" are transferred from data cells 50a and 50b, respectively, to second memory 40, starting at an even word address boundary. After this transfer, second pointer 47 is advanced to point to data cells 50c and 50d. At this point, second control circuit 48 will recognize that second pointer 47 is pointing to the last quantity to be transferred, and that the quantity is to be transferred to an even address, namely, N+2. In this instance, an action must be taken in order to prevent overwriting of the valid data quantity "Z" located at the odd address N+3. Accordingly, a read-modify-write is effected so that data quantity "Z" is transferred to the next successive data cell 50d following the data cell 50c containing the last data quantity to be transferred to second memory 40. Thereafter, both quantities "c" and "Z" may be transferred as a single word to second memory 40 beginning at even address N+2. Thus, a data string of an odd length may be transferred to a memory beginning at an even address with a read-modify-write step occurring prior to the transfer of the last data quantity within the string to second memory 40.

The read-modify-write feature may further be utilized where a data string of even length is to be transferred to a word/write memory beginning at an odd address. In this instance, an initial advancement of second pointer 47 to the bottom data cell 50h must occur as discussed in FIGS. 6a-d because the initial data quantity is written to an odd address. After writing this initial data quantity, there will be an odd length of data quantities remaining to be transferred and the transfer of these remaining quantities will be begin at an even address. Thus, after the initial read-modify-write, the remaining situation leaves an odd length data string to be transferred to an even address. This situation is exactly as that discussed in connection with FIGS. 7a-c. Accordingly, the transfer of two bytes at a time will occur until the last data quantity to be transferred is encountered. At this instance, a second read-modify-write will be performed as discussed in connection with FIGS. 7c in order to prevent overwriting of the valid data quantity remaining at the odd address following the even address to which the last data quantity, is to be written. Again, the read-modify-write prevents this overwriting from occurring and permits a single data byte to be written to a word-write only data bus and memory configuration.

Figure 8:
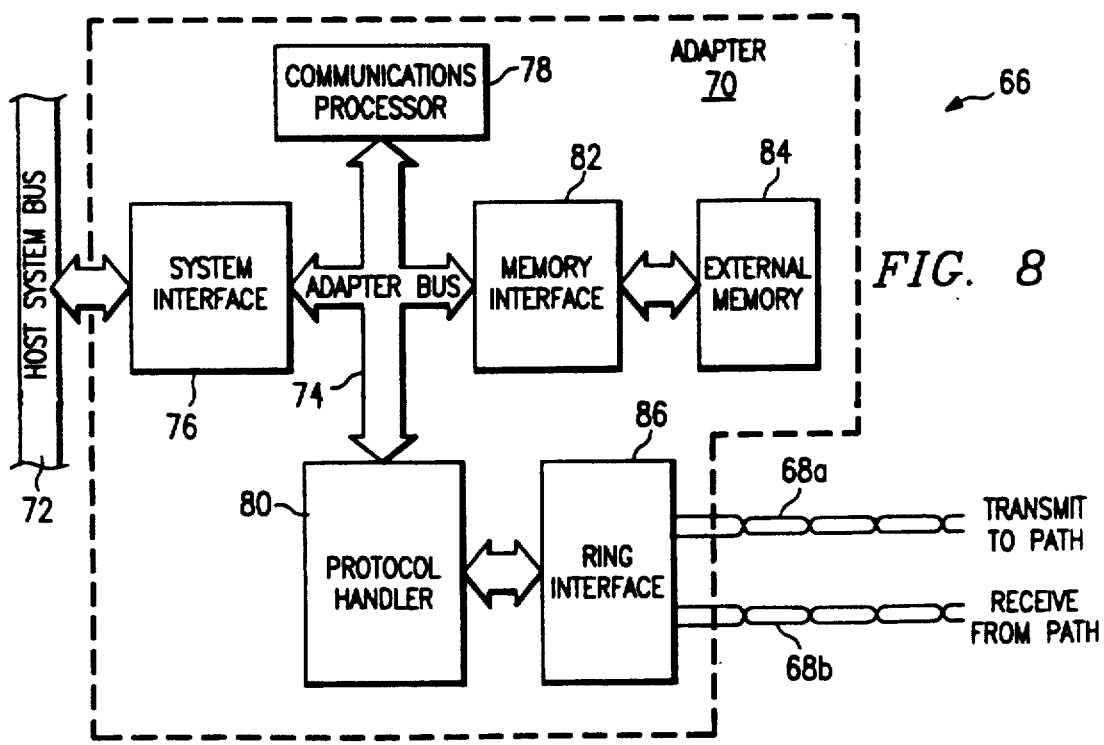
FIG. 8 illustrates a block diagram of a network application.

FIG. 8 illustrates a block diagram of a network application 66 of the present invention. Application 66 includes a transmit line 68a and a receive line 68b. Lines 68a and 68b are operable to communicate to a digital signal path, such as a token ring network. Application 66 further includes a local area network (LAN) adapter 70 and a host system bus 72. In general, LAN adapter 70 is connected between lines 68a and 68b and host system bus 72. Host system bus 72 in the preferred embodiment includes two 8-bit buses. LAN adapter 70 provides communication features such that information retrieved from the signal path may be temporarily stored prior to transmission to host system bus 72 and further so that information transferred from host system bus 72 may be temporarily stored prior to transmission to transmit line 68a.

LAN adapter 70 includes an adapter bus 74 connected to a system interface 76, a communications processor 78, a protocol handler 80 and a memory interface 82. Adapter bus 74 in the preferred embodiment includes two 8-bit buses. Accordingly, 16-bit transfers are generally permitted between adapter bus 74 and host system 72. Memory interface 82 is further connected to a memory block 84. Memory block 84 may comprise random access memory, and may be either external or internal to the chip including the other illustrated components within LAN adapter 70. Protocol handler 80 is further connected to a line interface 86 which connects to transmit and receive lines 68a and 68b.

In general, line interface 86 converts incoming and outgoing signals on transmit and receive lines 68a and 68b to proper voltage levels for internal and external processing. Incoming data is transferred to protocol handler 80 which implements general protocol functions. For example, in a token ring environment, protocol handler 80 examines a frame of data received from the signal path to determine whether the destination address corresponds to the particular LAN adapter 70 address. If the destination address is not that of the particular adapter, protocol handler 80 repeats the data frame without copying it. Conversely, if the destination address is that of the particular adapter, protocol handler 80 repeats the data frame and also copies it. Additionally, protocol handler 80 may change the state of single bits in the repeated data. Additional protocol handling features may be included within protocol handler 80 as understood by one skilled in the art.

System interface 76 is, in general, an interface between the host system through host system bus 72 and LAN adapter 70. Thus, system interface 76 is capable of performing DMA transfers between host system bus 72 and adapter bus 74. Therefore, host system bus 72 can access memory block 84 via system interface 76. Memory interface 82 is an interface between adapter bus 74 and external memory 84. Accordingly, this interface may provide numerous mapping features, accessing features and other memory related options known in the art.

Communications processor 78 may perform general CPU functions such as mathematics, comparisons and the like. Additionally, processor 78 may control general communications within LAN adapter 70 and also may perform DMA functions in communicating information from the network to the host system. In this capacity, communications processor 78 must efficiently process data while servicing continuing interrupts and context switches. Accordingly, the numerous aspects discussed above in connection with the present invention are advantageous when utilized within communications processor 78.

Although the present invention has been described in detail, it should be understood that various changes, alterations, and substitutions can be made herein without departing from the spirit and scope of the invention as defined by the appended claims.

What is claimed is:

1. A circuit for transferring units of data from a memory unit accessed by at lest two buses to a memory unit accessed by at lest one bus, comprising:

a plurality of data cells, each of said data cells for storing a unit of data;

first pointer circuitry for providing a first pointer to couple a first bus and a second bus to particular data cells within said plurality of data cells, such that a unit of data is transferred between the first bus and the data cell coupled to the first bus, or a unit of data is transferred between the second bus and the data cell coupled to the second bus, or a unit of data simultaneously transferred between the first bus and the data cell to which it is coupled while a unit of data is transferred between the second bus and the data cell to which it is coupled;

second pointer circuitry for providing a second pointer to couple a third bus to a data cell within said plurality of data cells such that a unit of data is transferred between the third bus and the data cell coupled to the third bus; and control circuitry for controlling when said first, second, or third bus is coupled to a data cell.

2. The circuit of claim 1 further comprising a data swapping circuit coupled between said first and second buses and said first pointer circuitry, wherein said data swapping circuit couples said first bus to a first cell of said data cells and said second bus to a second cell of said data cells in response to a first control signal from said control circuitry and couples said first bus to said second cell and said second bus to said first cell in response to a second control signal from said control circuitry.

3. The circuit of claim 1 wherein said second pointer circuitry couples a fourth bus to a data cell within said plurality of data cells, such that a unit of data is transferred between the fourth bus and the data cell coupled to the fourth bus, or a unit of data is simultaneously transferred between the third bus and the data cell to which said third bus is coupled while a unit of data is transferred between the fourth bus and the data cell to which said fourth bus is coupled.

4. The circuit of claim 3 further comprising a data swapping circuit coupled between said first and second buses and said first pointer circuitry, wherein said data swapping circuit couples said first bus to a first cell of said data cells and said second bus to a second cell of said data cells in response to a first control signal from said control circuitry and couples said first bus to said second cell and said second bus to said first cell in response to a second control signal from said control circuitry.

5. The circuit of claim 3 wherein said plurality of data cells comprises successive data cells, and transferring a unit of data to or from that data cell, further comprising:

first advancing circuitry for advancing said first pointer circuitry along a certain number of said successive cells such that the same number of units of data is simultaneously transferred between said first and second buses to or from said data cells coupled thereto; and second advancing circuitry for advancing said second pointer circuitry along said successive cells such that a number of units of data is simultaneously transferred between said third and fourth buses to or from said cells coupled thereto.

6. The circuit of claim 3 wherein said control circuitry controls when said first, second, third, or fourth bus is coupled to a data cell.

7. The circuit of claim 6 wherein said control circuitry comprises token circuitry for controlling a plurality of token data units wherein each of said plurality of token data units is associated with one of said plurality of data cells, and wherein said control circuitry passes said token data units between said first and second pointer circuitries to indicate whether said first or second pointer circuitry has access to the cell associated with that token data unit.

8. The circuit of claim 1 wherein said control circuitry has length circuitry for storing a value representing a number of data units to be transferred.

9. The circuit of claim 1 wherein said control circuitry has decrementing circuitry for decrementing a value representing a number of data units to be transferred after one or more of said data units are simultaneously transferred.

10. The circuit of claim 1 wherein said control circuitry has last flag circuitry for indicating that a unit of data stored within a particular data cell is the last unit of data to be transferred.

11. The circuit of claim 1 wherein said unit of data comprises eight bits of data.

12. The circuit of claim 1 wherein said first and second pointer circuitries each comprise:
a shaft register having bit positions that each correspond to one of said data cells; and
coupling circuitry for coupling one of said data cells to one of said buses in accordance with a position of a bit within said shift register.

13. The circuit of claim 1 wherein said first and second buses transmit/receive units of data at different rates of speed.

14. The circuit of claim 1 wherein said plurality of data cells comprises a circular first-in, first-out register.

15. The circuit of claim 1 wherein said plurality of data cells comprises successive data cells, and wherein access to a data cell by each of said buses is for transferring a unit of data to or from that data cell, further comprising:
first advancing circuitry for advancing said first pointer circuitry along a certain number of said successive data cells such that a number of units equal to the certain number of the successive data cells are simultaneously transferred between said first and second buses to or from said data cells coupled thereto.

16. The circuit of claim 1 wherein said control circuitry controls when said first, second, third, or fourth buses is coupled to a data cell.

17. The circuit of claim 16 wherein said control circuitry comprises token circuitry for controlling a plurality of token data units wherein each of said plurality of token data units is associated with one of said plurality of data cells, and wherein said control circuitry passes said token data units between said first and second pointer circuitries to indicate whether said first or second pointer circuitry has access to the one of the plurality of data cells associated with one of said plurality of token data units.

18. A circuit for transferring units of data from a memory unit access by at least two buses to the same or another memory unit access by at least two buses, comprising:
a plurality of successive data cells, each of said data cells for storing a unit of data;
pointer circuitry for coupling a first and second bus to two particular cells within said plurality of data cells, said pointer circuitry determining which two particular cells said first and second buses have access to;
advancing circuitry for advancing said pointer circuitry along a certain number of said data cells after a number of units equal to the certain number of said data cells are simultaneously transferred to or from said data cells coupled to said first and second buses.

19. The circuit of claim 18 further comprising control circuitry for controlling when said first or said second bus is coupled to a cell.

20. The circuit of claim 19 wherein said control circuitry comprises token circuitry for controlling a plurality of token data units wherein each of said plurality of token data units is associated with one of said plurality of data cells, and wherein said control circuitry passes said token data units between said first and second pointer circuitries to indicate whether said first or second pointer circuitry has access to the one of the plurality of data cells associated with one of said plurality of token data units.

21. A network adapter, comprising:
a ring interface for coupling the network adapter to a communications network;
a local bus, having a first and second local sub-bus, coupled to said ring interface;
a processing circuit coupled to said local bus;
a protocol handler coupled between said ring interface and said local bus;
a system interface coupled to said local bus, and for coupling said adapter to a host bus having a first and second host sub-bus; and
a circuit for transferring units of data between said local bus and said host bus, wherein said circuit comprises:
a plurality of data cells, each of said data cells for storing a unit of data;
first pointer circuitry for providing a first pointer to couple a first bus and a second bus to particular data cells within said plurality of data cells, such that a unit of data is transferred between the first bus and the data cell coupled to the first bus, or a unit of data is transferred between the second bus and the data cell coupled to the second bus, or a unit of data is simultaneously transferred between the first bus and the data cell to which it is coupled while a unit of data is transferred between the second bus and the data cell to which it is coupled;
second pointer circuitry for providing a second pointer to couple said third and fourth bus to particular data cells within said plurality of data cells such that a unit of data is transferred between the third bus and the data cell coupled to the third bus, or a unit of data may be transferred between the fourth bus and the data cell coupled to the fourth bus, or a separate unit of data is simultaneously transferred between the third bus and the data cell to which it is coupled while a unit of data is transferred between the fourth bus and the data cell to which it is coupled.

22. A network circuit, comprising:
a host computer system having a host bus; and a network adapter, comprising:
  a ring interface for coupling the network adapter to a communications network;
  a local bus, having a first and second local sub-bus, coupled to said ring interface;
  a processing circuit coupled to said local bus;
  a protocol handler coupled between said ring interface and said local bus;
  a system interface coupled to said local bus, and for coupling said network adapter to said host system; and
  a circuit for transferring units of data between said local bus and said host bus, wherein said circuit comprises:
    a plurality of data cells, each of said plurality of data cells for storing a unit of data;
    first pointer circuitry for providing a first pointer to couple a first bus and a second bus to data cells within said plurality of data cells, such that a unit of data is transferred between the first bus and the data cell coupled to the first bus, or a unit of data is transferred between the second bus and the data cell coupled to the second bus, or a unit of data is simultaneously transferred between the first bus and the data cell to which it is coupled while a unit of data is transferred between the second bus and the data cell to which it is coupled;
    second pointer circuitry for providing a second pointer to couple said third and fourth bus to particular data cells within said plurality of data cells such that a unit of data is transferred between the third bus and the data cell coupled to the third bus, or a unit of data is transferred between the fourth bus and the data cell coupled to the fourth bus, or a separate unit of data is simultaneously transferred between the third bus and the data cell to which it is coupled while a unit of data is transferred between the fourth bus and the data cell to which it is coupled.

23. A method of using an adapter circuit having a plurality of data cells and pointer circuitry, for transferring units of, the method:
  a step of selecting two receiving data cells within a plurality of data cells for access by the first and second bus;
  a step of using a first pointer to couple said first bus to a first receiving data cell of said two receiving data cells and said second bus to a second receiving cell of said two receiving cells, such that a unit of data is transferred between the first bus and said first receiving cell, or a unit of data is transferred between the second bus and said second receiving cell, or a unit of data is transferred between the first bus and said first receiving cell while a unit of data is transferred between the second bus and said second receiving cell; and
  a step of advancing said first pointer by a number of data units transferred to said two receiving data cells;
  a step of selecting a sending data cell within said plurality of data cells to access by a third bus; and
  a step of using a second pointer to couple the third bus to said sending data cell such that a unit of data is transferred between the third bus and said sending data cell; and
  a step of advancing said second pointer by a number of data units transferred from said sending data cell.

24. The method of claim 23 further comprising the following steps performed during or after the steps of selecting data and using a second pointer to couple the third bus to said sending data cell:
  selecting a second sending data cell within a plurality of data cells to access by a fourth bus; and
  using said second pointer to couple the fourth bus to said second sending data cell such that a unit of data is transferred between said third bus and the sending cell coupled to the third bus, or a unit of data is transferred between said fourth bus and said second second data cell, or a unit of data is transferred between said third bus and the sending data cell to which it is coupled while a unit of data is transferred between said fourth bus and said second sending data cell to which it is coupled.

25. The method of claim 24 further comprising the step of controlling when said first, second, third, or fourth bus is coupled to a data cell of said plurality of data cells.

26. The method of claim 25 wherein said step of controlling comprises controlling a plurality of tokens, wherein each of said plurality of tokens corresponds to one of the plurality of data cells, and wherein control of each of said plurality of tokens is exchanged between control circuits of said first pointer and said second pointer.

27. The method of claim 24 wherein said first and second buses are for transferring a certain number of data units to a certain address in a memory coupled to said third and fourth buses, and further comprising a step of performing a read-modify-write operation from the memory prior to commencement of the transfer of the data units when the certain address comprises an odd address, said step of performing a read-modify-write operation being performed after all selecting and coupling steps.

28. The method of claim 24 wherein said first and second buses are for transferring a certain number of data units wherein a single last unit is to be transferred to a certain address in a memory coupled to said third and fourth buses, and further comprising a step of performing a read-modify write operation from the memory prior to transfer of the single last unit to the third and fourth buses when the certain address comprises an even address.

29. The method of claim 24 wherein a certain number of units of data are to be transmitted from said first and second buses to said third and fourth buses, and further comprising a step of storing a length value equal to the certain number of unites of data to be transferred prior to the steps of claim 24 being performed.

30. The method of claim 29 further comprising the step of decrementing the said length value by a number of units equal to the certain number of unites of data to be transferred prior to the steps of claim 29 being performed.

31. The method of claim 23 wherein the units of data comprise a first and last unit of data, and further comprising the step of setting a last flag in one of the cells to indicate that a unit of data stored within the cell is the last unit of data.

32. The method of claim 23 wherein the unit of data comprises eight bits of data.

33. The method of claim 23 wherein the first and second buses transmit/receive units of data at different rates of speed.

34. The method of claim 23 wherein the plurality of data cells comprises a circular first-in, first-out register.

35. The method of claim 23 further comprising the step of controlling when said first, second, or third bus is coupled to a data cell of said plurality of data cells.

36. The method of claim 35 wherein said step of controlling comprises controlling a plurality of tokens, wherein each of said tokens corresponds to one of the plurality of data cells, and wherein control of said plurality of tokens is exchanged between control circuits of said first pointer and said second pointer.

37. A method of using an adapter circuit having a plurality of data cells and pointer circuitry, for transferring units of data between a memory accessed by two or more buses and the memory of another memory accessed by at least one bus, comprising:
   a step of coupling a first bus and a second bus via a first pointer to two data cells within a plurality of data cells;
   a step of receiving a unit of data from said first bus to a data cell to which it is coupled, or from said second bus to the data cell to which it is coupled from both said first and second buses to a data cell to which each is coupled; and
   a step of coupling a third bus and a fourth bus via a second pointer to two data cells within said plurality of data cells;
   a step of sending a unit of data to said third bus from a data cell to which it is coupled, or to said fourth bus from a data cell to which it is coupled; wherein each of said buses and each data cell of said plurality of data cells have a width equal to one unit of data and wherein said plurality of data cells comprises a circular first-in, first-out register.

38. The method of claim 37 further comprising the step of:
   using a control circuit to determine how far said first pointer and said second pointer are advanced after said transferring steps.

39. The method of claim 37 further comprising the steps of:
   advancing said first pointers along a same number of successive cells as are transferred during said receiving step; and
   advancing said second pointer along a same number of successive cells as are transferred during said sending step.

40. The method of claim 39 further comprising the step of using a control circuit to determine when said first pointer or said second pointer is coupled to data cells by using a plurality of tokens, wherein each of said plurality of tokens corresponds to one data cell of said plurality of data cells.

41. The method of claim 37 wherein said first and second buses are for transferring a certain number of data units to a certain address in a memory coupled to said third and fourth buses, and further comprising a step of performing a read-modify-write operation from the memory prior to commencement of a transfer of the data units when the certain address comprises an odd address, said step of performing a read-modify-write operation being performed after said coupling, receiving, and sending steps.

42. The method of claim 37 wherein said first and second buses are for transferring a certain number of data units wherein a single last unit is to be transferred to a certain address in a memory coupled to said third and fourth buses, and further comprising a step of performing a read-modify write operation from the memory prior to transfer of the single last unit to the third and fourth buses when the certain address comprises an even address, said step of performing a read-modify-write operation being performed after said coupling, sending, and receiving steps.

43. The method of claim 42 wherein the certain number of units of data are to be transmitted from said first and second buses to said third and fourth buses, and further comprising the steps of:
   a step of storing a length value a number of units equal to the certain number of units of data to be transferred, and
   a step decrementing said length value by the number of units transferring during said sending step.

44. The method of claim 43 further comprising the step of indicating that a unit of data stored within one of said plurality of data cells is a last unit of data to be transferred.

45. The method of claim 37 wherein the unit of data comprises eight bits of data and a single bit of parity indication.

46. The method of claim 37 wherein said step of coupling said first and second bus via a first pointer comprises:
   shifting a bit through a shift register; and
   performing said coupling in accordance with a location of the shifted bit within said shift register.

* * * * *